United States Patent [19]
Grant et al.

[11] Patent Number: 5,840,135
[45] Date of Patent: *Nov. 24, 1998

[54] ALUMINUM-BERYLLIUM ALLOYS HAVING HIGH STIFFNESS AND LOW THERMAL EXPANSION FOR MEMORY DEVICES

[75] Inventors: Larry A. Grant, Saratoga, Calif.; James M. Marder, Shaker Heights, Ohio; Wayne L. Wright, San Jose, Calif.

[73] Assignee: Brush Wellman Inc., Cleveland, Ohio

[*] Notice: The term of this patent shall not extend beyond the expiration date of Pat. No. 5,578,146.

[21] Appl. No.: 643,082

[22] Filed: May 2, 1996

Related U.S. Application Data

[62] Division of Ser. No. 587,135, Jan. 16, 1996, Pat. No. 5,578,146, which is a continuation of Ser. No. 333,942, Nov. 3, 1994, abandoned, which is a continuation of Ser. No. 156,356, Nov. 23, 1993, abandoned, which is a continuation of Ser. No. 770,187, Oct. 2, 1991, abandoned.

[51] Int. Cl.⁶ .................................................... C22C 21/00
[52] U.S. Cl. ......................... 148/405; 420/40; 420/528; 148/437; 360/104; 360/105; 360/106
[58] Field of Search .................... 420/40, 528; 148/437, 148/405; 360/104, 105, 106

[56] References Cited

U.S. PATENT DOCUMENTS

| | | |
|---|---|---|
| 3,456,322 | 7/1969 | Krock et al. |
| 4,346,416 | 8/1982 | Riggle et al. ............................ 360/106 |
| 4,710,834 | 12/1987 | Brand et al. ............................ 360/105 |
| 4,774,610 | 9/1988 | Kinjo ........................................ 360/104 |
| 4,814,908 | 3/1989 | Schmitz ................................ 360/77.02 |
| 4,860,135 | 8/1989 | Cain ...................................... 360/97.02 |
| 4,949,194 | 8/1990 | MacPherson et al. .................. 360/109 |
| 5,041,934 | 8/1991 | Stefansky ................................ 360/106 |
| 5,161,077 | 11/1992 | Jabbari ................................... 360/106 |
| 5,218,496 | 6/1993 | Kaczeus ................................. 360/106 |
| 5,260,847 | 11/1993 | Basehore et al. ....................... 360/106 |
| 5,268,805 | 12/1993 | Peng et al. .............................. 360/106 |
| 5,404,636 | 4/1995 | Stefansky et al. ........................ 29/603 |
| 5,578,146 | 11/1996 | Grant et al. ............................. 148/437 |

FOREIGN PATENT DOCUMENTS 2123852  2/1984  United Kingdom.

*Primary Examiner*—Patrick Ryan
*Assistant Examiner*—M. Alexandra Elve
*Attorney, Agent, or Firm*—Hopgood, Calimafde, Kalil & Judlowe, LLP

[57] ABSTRACT

Articles of manufacture are made of aluminum-beryllium alloys having substantially randomly distributed aluminum-rich and beryllium rich phases to provide substantially isotropic mechanical properties, such as high stiffness and low co-efficients of thermal expansion, whereby the articles of manufacture provide more rapid and accurate responses.

1 Claim, 2 Drawing Sheets

ALUMINUM-BERYLLIUM ALLOYS HAVING HIGH STIFFNESS AND LOW THERMAL EXPANSION FOR MEMORY DEVICES

This application is a division of application Ser. No. 08/587,135, filed Jan. 16, 1996, now U.S. Pat. No. 5,578, 146, which is a continuation of application Ser. No. 08/333, 942, filed Nov. 3, 1994, now abandoned, which is a continuation of application Ser. No. 08/156,356, filed Nov. 23, 1993, now abandoned, which is a continuation of application Ser. No. 07/770,187, filed Oct. 2, 1991, also abandoned.

FIELD OF THE INVENTION

The present invention relates to lightweight articles of manufacture having high stiffness and low coefficients of thermal expansion and, more particularly, articles of manufacture made of aluminum-beryllium alloys.

BACKGROUND OF THE INVENTION

Many articles of manufacture require lightweight parts which have high stiffness and low coefficients of thermal expansion. For example, actuator arms in computer disk drives are currently made of low density magnesium which exhibits relatively low stiffness (Young's Modulus) and a relatively high coefficient of thermal expansion. The low stiffness of magnesium increases response time and possibly reduces accuracy when large amplitudes of vibration are experienced during movement of the arm.

During operation of most disk drives, the head carried by the actuator arm is lifted from the disk surface by rotational air flow. If the vibrations caused by air flow are sufficiently large, actuator arms (or heads) with low stiffness may contact the disk and damage its surface.

It is generally understood that actuator arms in computer disk drives are subjected to significant forces which can cause vibration. The energy from these vibrations is dissipated as heat which causes the actuator arm to expand. Another source of heat is that generated by electronic components themselves. Thermal expansion is undesirable because it lowers the accuracy of the disk drive. High coefficients of thermal expansion increase the risk of inaccuracy as the dimensions of the arm vary with temperature.

According to one embodiment of the present invention, actuator arms for disk drives should have mechanical properties which are substantially isotropic. These mechanical properties minimize design problems and insure more predictable (i.e., accurate) results during production and operation.

The aluminum-beryllium alloys described in this specification have high moduli of elasticity, high strength to weight ratios and low coefficients of thermal expansion. These properties are suitable for articles of manufacture that are subjected to vibrations and thermal variations.

Aluminum-beryllium alloys are known in the art. Various aluminum-beryllium alloys and/or processes for production are disclosed in U.S. Pat. No. 1,254,987; 1,976,375; 2,244, 608; 3,147,110; 3,337,334; 3,456,322; 3,506,438; 3,548, 915; 3,548,94; and 3,687,737.

Other patents and publications similarly disclose aluminum-beryllium alloys, methods of production or end-use applications. Japanese patent application 56-146387 (1981) discloses a stack of thin alternating layers of aluminum, titanium, nickel or magnesium and flakes of a reinforcing material (beryllium, mica or glass) to provide a sound attenuating plate. U.S. Pat. No. 3,609,855 discloses aluminum-beryllium and beryllium-titanium composites.

None of these art-recognized alloys are substantially isotropic, nor are they specifically directed toward electro-mechanical memory applications such as disk drive arms or disks.

OBJECTS OF THE INVENTION

Accordingly, it is an object of the present invention to provide an article of manufacture made of an aluminum-beryllium alloy with a high elastic modulus to permit smaller, thinner, more accurate assemblies.

Another object of the present invention is to provide a substantially isotropic article of manufacture which has a high shear modulus to minimize the amplitude of vibration.

An even further object of the present invention is to provide a substantially isotropic article of manufacture for end-use applications where accuracy and response time are of principal importance.

BRIEF DESCRIPTION OF THE INVENTION

The present invention is directed to articles of manufacture having substantially isotropic mechanical properties. They are made of alloys consisting essentially of between about 40% and 95% beryllium and the balance essentially aluminum.

DETAILED DESCRIPTION

In accordance with the present invention articles of manufacture which have isotropic properties of high stiffness and low coefficient of thermal expansion are made of aluminum-beryllium alloys. These alloys have a microstructure of randomly distributed crystals of aluminum-rich and beryllium-rich phases to provide substantially isotropic mechanical properties. The alloys consist essentially of between about 40% and 95% beryllium with the balance essentially aluminum. Between about 50% and 75% beryllium is preferred, and between about 55% and 65% beryllium is most preferred. All compositions used herein are given on a weight basis unless otherwise stated.

The articles made of these materials may be processed using a variety of standard metal forming techniques. For example, vacuum induction-melted ingots of the proper composition could be cast, and the castings extruded to provide a long bar of the appropriate dimensions. The individual components could then be machined from the extruded bar. Alternatively, the alloy melt could be precision cast into individual components. As a third possible processing path, the alloy could be made as a powder and consolidated to form either an extrusion billet or directly to net shape. Potential net shapes processes including, but are not limited to Hot Isostatic Pressing, Metal Injection Molding or Cold Isostatic Pressing followed by vacuum sintering.

Figure 1:
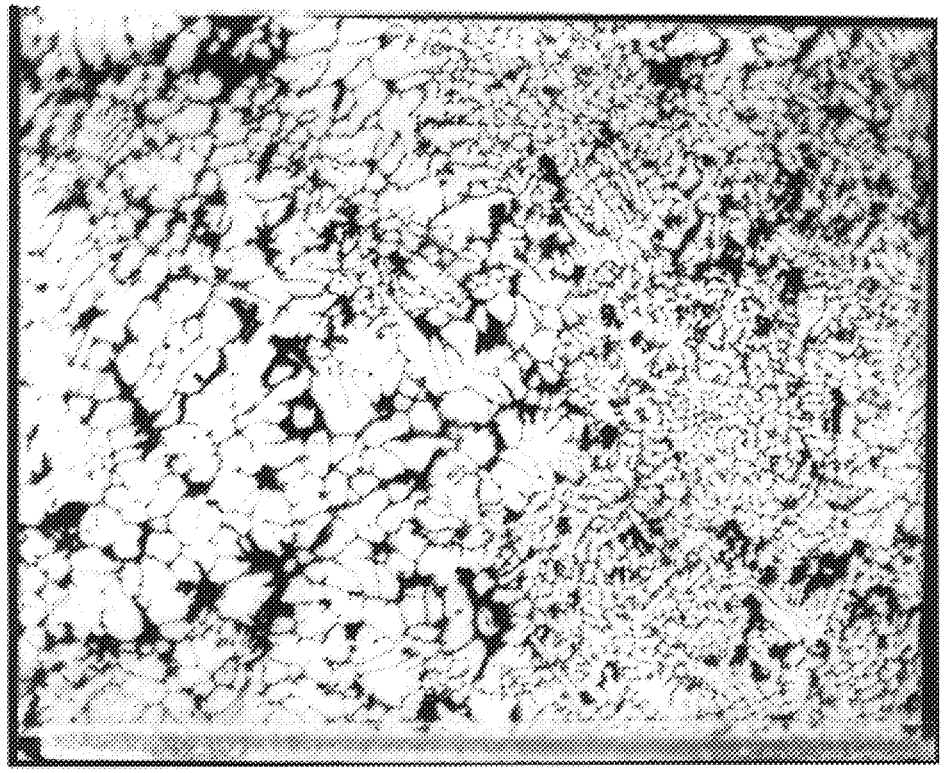
FIG. 1 is a photomicrograph of an arc cast aluminum 62% beryllium alloy at a magnification of 50 times.

The isotropic properties of aluminum-beryllium alloys are an important aspect of the present invention. As used in this specification, the term "substantially isotropic" means that the mechanical properties are substantially the same in all directions. This characteristic differs from laminated structures where the mechanical properties are significantly different in the longitudinal and traverse directions. FIG. 1, a photomicrograph of an arc cast aluminum 62% beryllium alloy at a magnification of 50 times, shown as equiaxed structure which provides substantially isotropic properties.

The alloys of the present invention have high elastic moduli (i.e., the ratio of elastic modulus to density). Alloys having high elastic and shear moduli minimize the amplitude of vibrational forces which act on assembled components. These properties improve performance by providing faster response time and more precise location of the vibrating component.

Aluminum-beryllium alloys also have low coefficients of thermal expansion, e.g., less than about $18.8 \times 10^{-6}$ inch per 1° C. for the 60% Al–40% Be alloy, and $16.2 \times 10^{-6}$ ° C. for the 40% Al –60% Be alloy. This compares to $24 \times 10^{-6}$ °C. for pure Al. Electrically generated heat in a computer or other device causes; the damping element to expand. Low coefficients of thermal expansion for aluminum-beryllium alloys permit accurate location of component parts during end-use application. This advantage: is derived by reducing dimensional changes which may result from temperature variations caused by vibrational damping.

Figure 2:
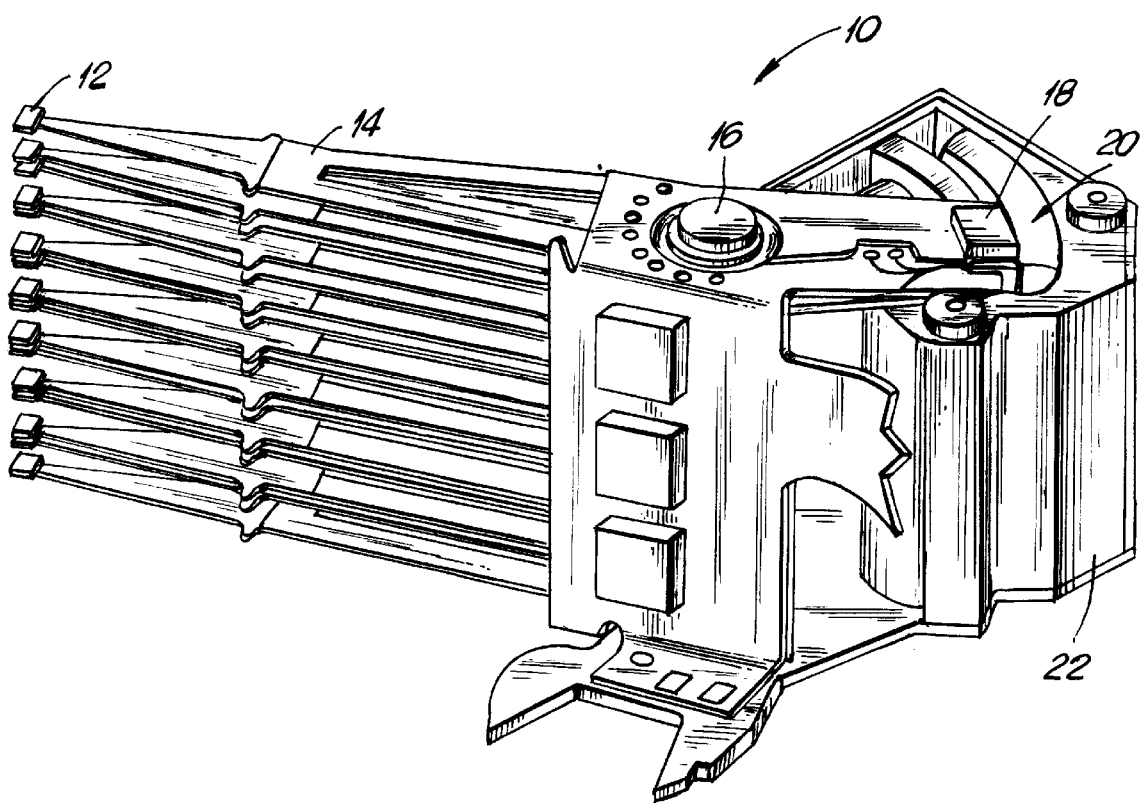
FIG. 2 illustrates an assembly of read/write heads for a computer disk drive.

Non-limiting examples of articles manufactured in accordance with the present invention are actuator arms for disk drives, turbine blades and aircraft skins. FIG. 2 illustrates a read/write assembly for hard disk drive 10 having multiple heads 12 mounted on actuator arms 14. Heads 12 and actuator arms 14 are assembled together on actuator shaft 16 which is rotated by the interaction of wire coil 18 and magnet 20 housed in magnet housing 22. Actuator arms 14 are spring loaded to rest on the disk when it is stationary. When the disk is rotated air pressure develops beneath head 12 and lifts it slightly above the disk.

Figure 3:
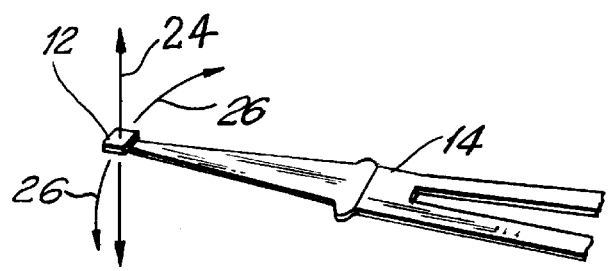
FIG. 3 illustrates a single actuator arm from the disk drive of FIG. 2. Forces exerted on the arm are represented by vectors.

As seen from the above description, actuator arms 14 are subjected to vertical forces 24 and angular forces 26 as shown in FIG. 3. Actuator arms 14 should be sufficiently stiff to minimize the amplitude of vertical vibration to avoid damaging the disks above and below actuator arms 14. Likewise, actuator arms 14 should be sufficiently stiff to minimize the amplitude of lateral vibration and provide a more rapid response time for reading or writing at an appropriate address on the disk. Laminated materials are effective in minimizing deflections principally in the vertical direction. The randomly oriented grain structures of alloys described in this specification are effective to minimize deflections in both the vertical and lateral directions.

In order to provide a better appreciation of this invention an illustrative example is presented below.

Pure aluminum and pure beryllium, as "pigs" and "pebbles", respectively, would be melted in the appropriate ratio to form a molten aluminum beryllium alloy of the desired composition. If a 40% Al–60% Be (by weight) alloy were desired, the ratio necessary to achieve this in the final solid product would be charged into the furnace. During melting, homogenization to achieve uniformity of composition would occur. The uniform melt would then be caused to flow through a nozzle in which it would be impinged upon by high pressure inert gas to form a uniform powder in which each particle has the desired composition. This process is known as inert gas atomization. The resultant particles would be collected, placed into an extrusion can, and in one extrusion step, consolidated into a long, solid bar. This bar could then be machined to achieve the desired dimensions. The outer envelope of the bar could be designed so that a large number of articles could be cut to length from the bar without machining the outer dimensions.

Properties of major importance in disk drive arms would be the modulus of elasticity, density and thermal expansion coefficient. These property values would be expected to be approximately $29 \times 10^{-6}$ pounds per square inch, 0.076 pounds per cubic inch and $16 \times 10^{-6}$ in./in./°C., respectively.

Although the present invention has been described in conjunction with preferred embodiments, it should be understood that modifications and variations may be adopted without departing from the spirit of the invention as those skilled in the art will readily understand. These modifications and variations are within the scope of the present invention as defined by the following claims.

What is claimed is:

1. A rotatable armset of an actuator having a bore for rotating about an actuator shaft for positioning a head of the actuator radially across a disk of a disk drive, wherein the armset is a one piece unit entirely comprised of an alloy consisting essentially of about 40% to about 95% beryllium and the balance essentially aluminum, the alloy having a microstructure of randomly distributed crystals of aluminum-rich and beryllium-rich phases, and having isotropic properties of high stiffness and low coefficient of thermal expansion.

* * * * *